Oct. 26, 1965 J. N. COOPER ETAL 3,213,825

VACUUM DEPOSITION APPARATUS

Original Filed Dec. 31, 1959

JOHN N. COOPER
EUGENE C. CRITTENDEN, Jr.
*INVENTORS*

BY

*ATTORNEY*

United States Patent Office 3,213,825

Patented Oct. 26, 1965

3,213,825

VACUUM DEPOSITION APPARATUS

John N. Cooper, Carmel, and Eugene C. Crittenden, Jr., Monterey, Calif., assignors, by mesne assignments, to TRW Inc., a corporation of Ohio Original application Dec. 31, 1959, Ser. No. 863,138, now Patent No. 3,113,889, dated Dec. 10, 1963. Divided and this application June 13, 1962, Ser. No. 202,171

4 Claims. (Cl. 118—49)

This invention relates generally to improvements in the art of depositing thin films, and more particularly to improved apparatus for forming thin-metal superconductive films. This application is a division of copending application Serial No. 863,138, filed December 31, 1959, now Patent No. 3,113,889.

In the investigation of the electical properties of materials at very low temperatures it has been found that the electrical resistance of many materials drops abruptly as the temperature is lowered to that close to absolute zero (zero degrees Kelvin)—the material in such a state being termed superconductive. Superconductive materials have been used to construct computer circuit components of increased speed and reduced size, superconductive materials lending themselves to the performance of switching operations within a millimicrosecond and to the provisions of memory densities of hundreds of thousands of memory units per cubic foot. Such switching speeds and memory densities give rise to the need for thin metallic films of high precision (the dimension of a thin film computer component often critically determines its functional characteristics) and high structural strength (the mechanical failure of a single memory unit would result in the incapacitation of the entire memory). For example, it has been determined that the thickness dimension of a thin film superconductive switch element is a critical factor in establishing both the electrical current level of the input signal to which the element responds as well as the speed of the response of the element to an input signal of a given level. Since these elements are very thin to begin with, say of the order of .4 micron or less in thickness, any slight nonuniformities in the thickness dimension of a given element will radically change its switching characteristics.

It is therefore an object of this invention to provide an improved apparatus for making thin film superconductive elements having uniform thickness dimensions.

It is another object of this invention to provide an improved apparatus for vacuum depositing a thin film superconductive element on a substrate, whereby the element is virtually free from thickness nonuniformities and exhibits appreciable mechanical integrity.

The invention will be understood clearly and fully from the following detailed description with reference to the accompanying single sheet of drawings in which.

Figures 1, 2, 3, 4, 5:
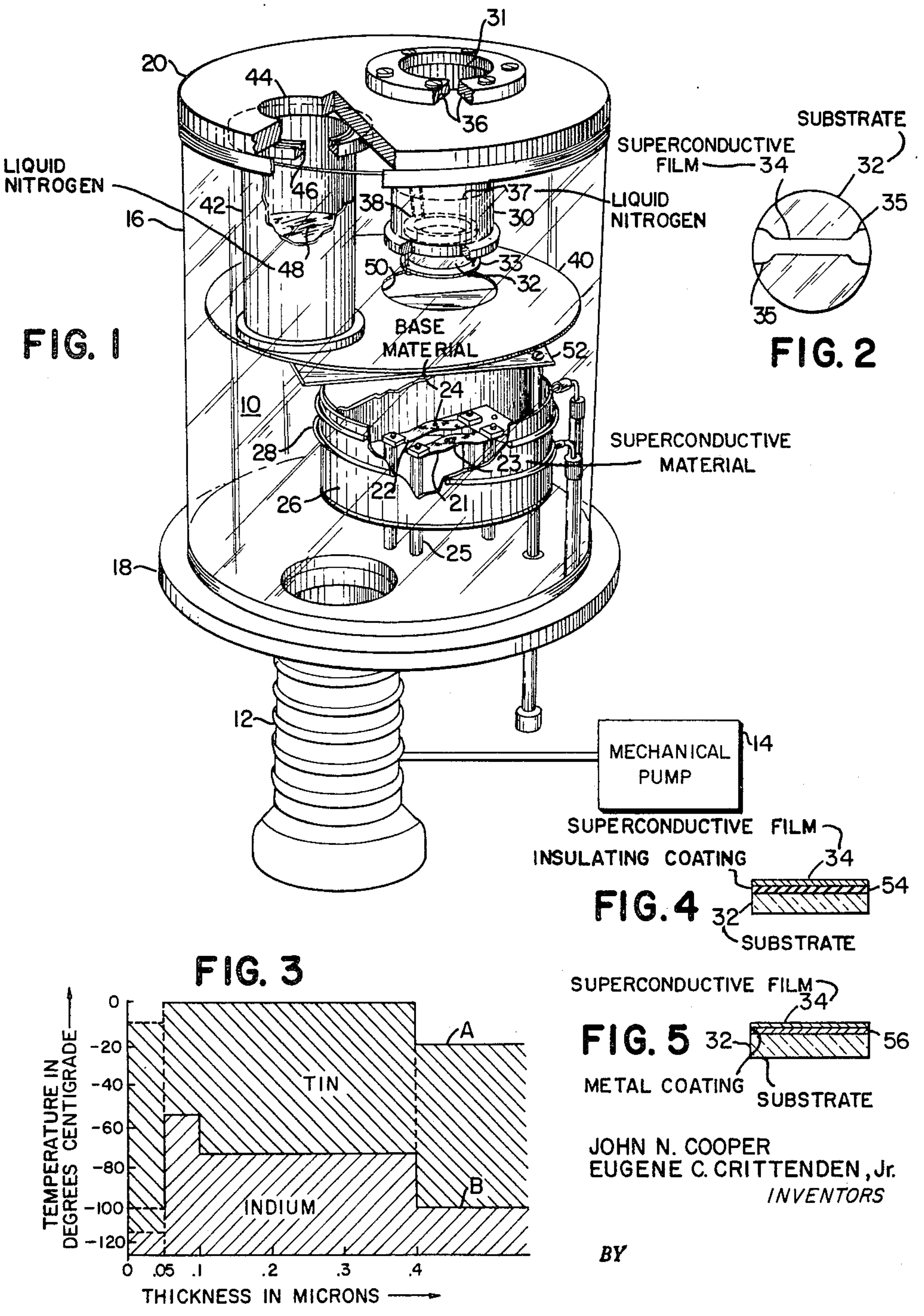
FIG. 1 is a diagrammatic view of a vacuum coating apparatus in accordance with the invention.
FIG. 2 is a plan view of a superconductive film coated on a substrate by means of the apparatus of the invention.
FIG. 3 is a series of graphs illustrating the optimum values of deposition temperature for superconductive films of tin and indium.
FIG. 4 is a sectional view of a substrate provided with a base coating of insulating material prior to the deposition of a superconductive film.
FIG. 5 is a sectional view of a substrate provided with a base coating of metal prior to the deposition of a superconductive film.

One form of vapor deposition apparatus for practicing the invention is shown schematically in FIG. 1. The apparatus includes a vacuum chamber 10 and means, including a diffusion pump 12 and a mechanical pump 14, for producing a high degree of vacuum within the chamber 10. The vacuum chamber 10 is defined by a hollow glass cylinder 16 closed at its lower end by a bottom plate 18 and at its upper end by a top plate 20.

Within the lower half of the chamber 10 is disposed an evaporator assembly that includes evaporator boats 21 and 22. One of the boats 21 contains a charge of superconductive metal coating material 23 to be evaporated, while the other boat 22 holds a charge of base coating material 24. The ends of the boats 21 and 22 are connected to metal conductors 25 which supply electrical heating current to the boats 21 and 22 from an electrical power source (not shown). A tubular metal shield 26, open at the top to permit the passage of metal vapors from the boats 21 and 22, surrounds the boats. The shield 26, which is surrounded by water cooled pipes 28, helps to prevent the radiant energy emitted by the boats 21 and 22 (during heating of the boats) from falling on the walls of the chamber 10 and other surrounding structure and effecting the evolution of gas impurities.

Within the upper half of the chamber 10 is disposed a support cup 30 for holding a substrate 32 to be coated. The substrate 32, which may be a glass or quartz plate, is cemented or otherwise fixed to the outside bottom surface of the support cup 30 so that it can be removed from the cup 30 when the coating process is completed. A mask 33 is mounted on the exposed surface of the substrate 32 to define the pattern of the superconductive film deposited on the substrate 32. As shown in greater detail in FIG. 2, the substrate 32 may support a thin superconductive film 34 of generally rectangular shape and having widened ears 35 at the ends thereof to serve as terminals for connection to a voltage source (not shown).

The support cup 30 (FIG. 1) is mounted in an opening 31 in the top plate 20 so that the inside of the cup 30 is open to the atmosphere, whereas the outside of the cup 30 is within the chamber 10. The cup 30 is provided with a sealing gasket 36 to provide a vacuum seal between the cup 30 and the chamber 10. The inside of the cup 30 holds a quantity of coolant 37, such a liquid nitrogen, for maintaining the substrate 32 at a reduced temperature during the superconductive metal coating process. In addition, an electric heater coil 38, which may be energized from an external source (not shown), is positioned in the bottom of the cup 30 so as to maintain the substrate 32 at an elevated temperature during the deposition of other coating material, such as the base coating material 24, or nonsuperconductive (e.g. insulating) material used in the fabrication of sandwich structures.

The vacuum pumps 12 and 14 are capable of providing a vacuum of the order of $5 \times 10^{-6}$ millimeters of mercury. However, considerably lower pressures than this are necessary to vacuum deposit thin film elements which are of the required purity to make them function as superconductors. In order to reduce the vacuum pressure to the required low amount, a "cold trapping" device is provided within the chamber 10. The "cold trapping" device comprises an aluminum trap plate 40 mounted intermediate the substrate 32 and the evaporator boats 21 and 22 and supported by a second cup 42 to which the trap plate 40 is joined in good thermal contact. The second cup 42 is supported in an opening 44 in the top plate 20 and is provided with a vacuum tight sealing gasket 46. The second cup 42 contains a liquid nitrogen coolant 48 to maintain the temperature of the second cup 42 and the trap plate 40 at a temperature of around 77 degrees Kelvin. The trap plate 40 has a large central opening 50 to permit the flow of the desired evaporated materials from the boats 21 and 22 to the substrate 32. A movable masking member 52, which is free to be rotated from the outside of the chamber 10, is positioned between the boats 21 and 22 and the trap plate 40 so that it can be moved, when desired, to close off the opening 50 and interrupt the flow of metal vapor.

Since the trap plate 40 is maintained at a very low temperature, it acts like an additional pump by causing the condensation thereon of molecules of any of the gas impurities which may be evolved during the coating process. These impurities, which may be present in the charges of superconductive metal and base coating materials 23 and 24, are liberated upon the heating of the coating materials to vaporization temperature. In addition, gas impurities may be liberated from the walls of the chamber 10 and from the evaporator structures, as the temperature of those structural parts is raised somewhat during the vaporization process, notwithstanding the presence of the radiation shield 26.

The trap plate 40 is desirably placed in the central region of the chamber 10 between the evaporator assembly and the substrate 32, with the boats 21 and 22 and substrate 32 being well spaced from each other. Such a central disposition of the trap plate and wide spacing of the boats and substrate give the trap plate a high probability of trapping stray molecules of condensable vapor.

The low temperature trap plate 40 simulates an open hole through which condensable vapor molecules effuse and can not return. The "speed" of a one square centimeter of open hole through which molecules effuse is about 10 liters per second. In one form of the vacuum coating apparatus, in which the diameter of the glass cylinder 16 is 17 inches, the trap plate 40 has a total surface area, both sides included, of 2000 square centimeters. Such a plate thus acts like a pump with a speed of 20,000 liters per second for condensable vapor molecules, as compared to a speed for the conventional pumps 12 and 14 of 50 liters per second. By means of the cold trap plate 40, the vacuum inside the chamber 10 can be reduced to about $2\times10^{-8}$ millimeters of mercury, whereas without the trap plate 40, the pumps 12 and 14 can provide a vacuum of only $5\times10^{-6}$ millimeters of mercury.

It has been determined that extremely uniform thin metal superconductive films can be formed on a substrate by reducing the temperature of the substrate. One of the mechanisms by which this occurs is believed to be associated with the reduced surface mobility of the metal atoms as they arrive on a low temperature substrate. It is believed that crystals of the metal first begin to grow from the initially deposited metal atoms which come to rest on the substrate, these atoms serving as the first seeds of crystal nuclei. As the crystals grow from these first seeds, later arriving atoms which have not yet come to rest are attracted to these crystals rather than to the bare substrate. The crystals continue to grow until they touch each other and merge into a continuous film. It has been determined that the mobility of the arriving atoms is reduced by reducing the temperature of the substrate; a reduction in temperature causes a greater number of arriving atoms to come to rest and serve as crystal seeds before merging with already growing crystals. By starting with a greater number of seeds, the crystals will grow into a more uniform film.

Once the crystals have started growing, some crystal faces may have a tendency to grow faster than others by a phenomenon known as the Frank spiral crystal growth mechanism, discovered by Professor F. C. Frank at the University of Bristol, England. The crystal faces that grow more rapidly are those that have a spiral dislocation ending in them. The critical condition necessary for this type of crystal growth to occur is the ability of arriving atoms to accept or reject a site on a crystal face according to the stability of the atoms in this site. It has been determined that this freedom of the atom, or its mobility, can be reduced by reducing the temperature of the substrate, thereby preventing the uneven growth of crystals.

While the phenomena discussed above would appear to dictate that the temperature of the substrate should be maintained as low as possible, there is a different effect which works against reducing the substrate temperature; namely, that the tensile stress developed in a vacuum deposited metal film increases as the temperature of the substrate is reduced. The increased stress is believed to be associated with the reduced mobility, or freedom, of the atoms in permitting them to find their proper locations on the growing crystal lattice. As the atoms become buried in subsequent layers, they succumb to the increased forces tending to rearrange them. In the rearrangement to the proper crystal structure, the volume of the metal is reduced and tensile stress is thus developed in the film. As the thickness of the film builds up, the tensile forces may increase to the point where they ultimately cause the film to rupture in spots, or even peel from the substrate.

Accordingly, a critical temperature is set forth for the deposition of thin superconductive films. This critical temperature assures that the deposited films will have the required high degree of uniformity in thickness and will also be free from temperature induced ruptures. The optimum temperature is found to be that temperature at which the maximum tolerable stress is developed in the film without giving rise to a tendency toward film rupture.

FIG. 3 shows graphically the optimum deposition temperatures for various ranges of film thicknesses of tin (graph A) and of indium (graph B). Referring to graph A, it is seen that for tin, the optimum deposition temperature remains constant at zero degrees centigrade as the film thickness is increased from .05 micron to .4 micron. For thicknesses below .05 micron, the temperature must be reduced below zero degrees, depending on the thickness, in order to improve the uniformity. In this small thickness range the temperature can be reduced by substantial amounts before the tensile forces reach the rupture point. For thicknesses above .4 micron, the temperature must be reduced to −20 degrees centigrade in order to overcome nonuniformity caused by unequal rates of crystal growth.

Referring to graph B, indium shows a similar characteristic in requiring lower temperatures in the thinnest ranges, below .05 micron, and in the thickest ranges, above .4 micron. For thicknesses smaller than .05 micron, the temperature must be reduced below −100° C. in order to provide adequate uniformity. For a film thickness between .05 and .1 micron, the temperature must be raised to −50° C. to prevent ruptures. For film thicknesses above .1 micron, the nonuniformity caused by unequal crystal growth becomes a more serious problem. Thus the temperature must be lowered to −70° C. for thicknesses between .1 and .4 micron, and then to −100° C. for film thicknesses above .4 micron.

In carrying out the film deposition, the apparatus is assembled as shown in FIG. 1 and the chamber 10 is evacuated. When the desired evacuation pressure is reached (of the order of $2\times10^{-8}$ millimeters of mercury), heating current is applied to the evaporator boat 21 to melt the superconductive metal charge 23 and cause the metal vaporization to begin. At this stage, the masking member 52 is positioned between the boat 21 and the substrate 32 so that no metal is deposited on the substrate.

During this time the support cup 37 is partially filled with liquid nitrogen to reduce the temperature of the substrate 32 to the desired value. A thermocouple (not shown) may be connected to the substrate 32 to indicate when the desired temperature is reached. When the desired temperature is indicated, and when sufficient time has elapsed so that the vaporization is proceeding at a uniform rate, the masking member 52 is rotated out of masking position so as to permit the flow of metal vapors on to the substrate 32. At the end of a predetermined time, when the desired thickness of metal has been deposited, the masking member is rotated to its masking position to terminate the deposition. The coolant 37 in the support cup 30 is then removed to return the substrate to room temperature.

It has been found that the surface conditions of the substrate may cause nonuniformities in the thickness of the deposited metal film. For instance, surface scratches that are present in a polished substrate surface may contain minute amounts of foreign material. The foreign material in these scratches may have a different affinity for the metal vapor atoms from that of the substrate material. The metal atoms will tend to build up preferably in the areas where the affinity for them is greater, thus giving rise to thickness nonuniformities.

In order to overcome this effect, it is preferred to coat the substrate 32 (FIG. 4) with a very thin base coating 54 prior to the deposition of the superconductive metal film 34. The coating 54 may be vapor deposited by heating the base coating material 22 in the boat 24. Such a base coating 54 will cover up the substrate surface nonuniformities and give the substrate a surface that is uniform in composition and thus one having the same affinity, over all surface areas, for metal vapor atoms. Insulating films such as silicon monoxide, magnesium fluoride, and zinc sulfide are suitable for this purpose. Such a coating 54 may itself at first have some thickness nonuniformities due to variation in surface affinity. However the nonuniformities virtually disappear after a thickness of the order of 500 angstrom units has been deposited.

When the base coating 54 of insulating material is applied, the substrate 32 is maintained at an elevated temperature. For example, a base coating 54 of zinc sulfide is deposited at 100° C. When serving as a base for tin, silicon monoxide is deposited at 150° C.; when serving as a base for indium, the silicon monoxide is deposited below 135° C. The heater coil 38 may be used to raise the temperature of the substrate 32 to the desired value. The coil 38 may also be used to heat the substrate 32 in the event that it is desired to employ other coatings of insulating material sandwiched between superconductive metal elements.

Another method of reducing the surface roughness of the superconductive metal film 34 is to precoat the substrate 32 (FIG. 5) with a very thin base layer 56 of a metal having a relatively high melting point and a corresponding low surface mobility of its atoms. Such a coating 56 will have a high density of crystal nuclei. In general, the superconductive metal atoms, such as the atoms of tin or indium, will nucleate on these tiny metal crystals in preference to nucleation on the substrate surface, and start a very uniform film. The metal base coating 56 should be very thin to avoid the electrical short circuiting of the superconductive film, as the base coating 56 is electrically in parallel with the super-conductive film 34. The metal base coating 56 should also be very thin to avoid stress failure within it. Thicknesses of 10 to 50 angstrom units are suitable for the metal base coating 56. Antimony is especially well suited as a base coating for superconductive indium, with the antimony being deposited at room temperature. Such a combination may give rise to the formation of a thin layer of the compound indium-antimonide at the junction between the antimony and indium. This compound, which is a semi-conductor with a very high resistivity, may assist in reducing the electrical short circuiting effect of the antimony.

By employing a base coating 56 of thin metal, the substrate temperature may be increased somewhat for the deposition of intermediate superconductive film thicknesses, which for indium is in the vicinity of .05 micron in thickness. For larger thicknesses, differential crystal growth predominates and the use of a metal base coating is less effective. For much smaller thicknesses of superconductive metal the metal base coating becomes rather thick relative to the indium and interferes with the superconducting behavior of indium. Fortunately, the thickness range of indium that turns out to be the most adaptable for the employment of a metal base coating also turns out to yield the optimum speed of response of the indium film to an electrical current signal.

It is now apparent that by means of the improved apparatus of the invention, superconductive thin film elements can be readily formed with improved uniformity in film thickness and without temperature induced ruptures. Furthermore, by means of the novel apparatus, such films can be formed in sandwich structures and satisfy different temperature requirements.

The embodiments of the invention in which an exclusive property or privilege is claimed are defined as follows:

1. Vacuum deposition apparatus comprising: means defining a vacuum chamber, exhaust means connected to said chamber, an evaporator assembly mounted in one region of said chamber, a holder for an article to be coated mounted in another region of said chamber and spaced from said evaporator assembly, a plate of relatively great extent as compared to said holder and said evaporator assembly and formed with an opening in a central region thereof, means mounting said plate between said holder and said evaporator assembly with said opening in register with said holder and said evaporator assembly, and cooling means thermally coupled to said plate for maintaining said plate at a temperature lower than the ambient.

2. Vacuum deposition apparatus comprising: means defining a vacuum chamber; exhaust means connected to said chamber; an evaporator assembly mounted in one region of said chamber; a holder for an article to be coated mounted in another region of said chamber and spaced from said evaporator assembly;

a plate of relatively great extent as compared to said holder and said evaporator assembly, and formed with an opening in a central region thereof;

and means mounting said plate between said holder and said evaporator assembly with said opening in register with said holder and said evaporator assembly, said mounting means including a container projecting within said chamber and having a cavity that is accessible from the outside of said chamber for the reception of a liquid coolant;

said container and said plate being thermally coupled whereby said plate may be cooled substantially to the temperature of the liquid in said container.

3. Vacuum deposition apparatus comprising: means defining a vacuum chamber;

exhaust means connected to said chamber;

an evaporator assembly mounted in one region of said chamber;

a holder for an article to be coated mounted in another region of said chamber and spaced from said evaporator assembly, said holder including a container projecting within said chamber and having a cavity that is accessible from the outside of said chamber for the reception of means in said cavity for varying the temperature of said container, said container having an outside surface exposed within said chamber and against which said article may be mounted in thermal exchange relationship, whereby said article may be varied in temperature;

a plate of relatively great extent as compared to said holder and said evaporator assembly, and formed with an opening in a central region thereof;

means mounting said plate between said holder and said evaporator assembly with said opening in register with said holder and said evaporator assembly; and cooling means thermally coupled to said plate for maintaining said plate at reduced temperature.

4. Vacuum deposition apparatus comprising:

means defining a vacuum chamber and including a hollow cylinder, a top plate closing one end of said cylinder, a bottom plate closing the other end of said cylinder;

first and second containers sealed vacuum tight in said top plate and defining cavities projecting side by side within said chamber so as to be accessible from outside of said chamber, with said first container projecting a greater distance into said cavity than said second container; said second container including means for supporting an article to be coated;

a trap plate of relatively large extent mounted on said first container at its innermost extremity and extending across said chamber at a median portion thereof, said trap plate being formed with an opening therein and having one side thereof adjacent to said second container;

and an evaporator assembly mounted adjacent to the other side of said trap plate;

said second container, said trap plate opening, and said evaporator assembly being mounted in mutual register.

References Cited by the Examiner

UNITED STATES PATENTS

| | | | |
|---|---|---|---|
| 2,074,281 | 3/37 | Sommer | 118—49 |
| 3,023,727 | 3/62 | Theodoseau et al. | 117—38 |

CHARLES A. WILLMUTH, *Primary Examiner.*

RICHARD D. NEVIUS, *Examiner.*